Jan. 12, 1954    D. C. MOLLENHOUR    2,665,897
GEARLESS DRIVE FOR SPEED AND DISTANCE RECORDING INSTRUMENTS
Filed March 19, 1951
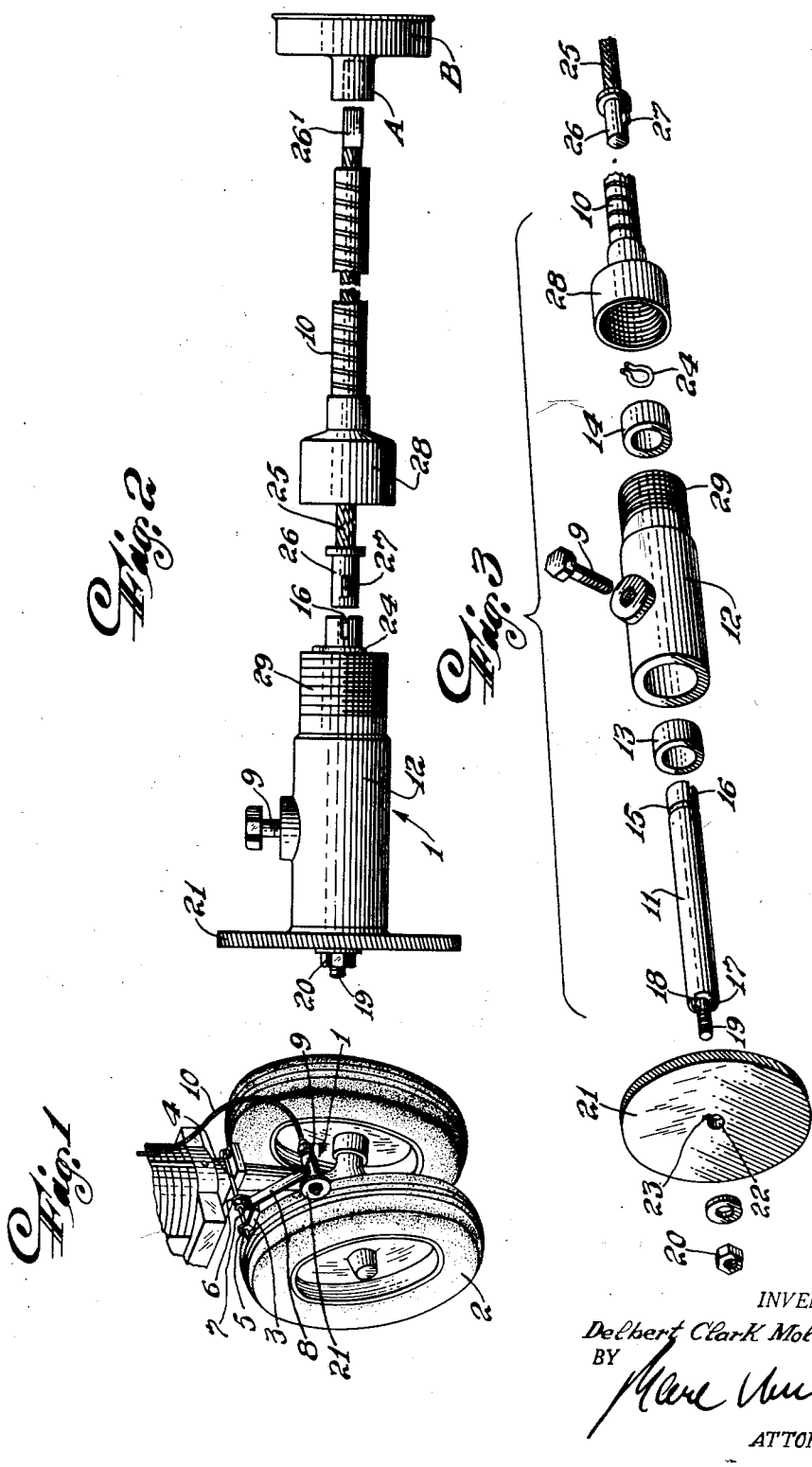
INVENTOR.
Delbert Clark Mollenhour
BY
ATTORNEY Patented Jan. 12, 1954

2,665,897

UNITED STATES PATENT OFFICE 2,665,897

GEARLESS DRIVE FOR SPEED AND DISTANCE RECORDING INSTRUMENTS

Delbert Clark Mollenhour, Mentone, Ind., assignor to Frank Manufacturing Company, Inc., Mentone, Ind., a corporation of Indiana Application March 19, 1951, Serial No. 216,408

2 Claims. (Cl. 264—2)

The present invention deals with a drive means for speedometers and more particularly with a gearless drive for speed and distance recording instruments.

Various types of drives for speedometers have been employed intermediate of a moving part of a vehicle and the speedometer for providing an indication of the speed and distance traveled by the vehicle. In some cases the drive mechanism for a speed responsive instrument is connected to a rotating part of the vehicle which reflects the speed of the vehicle. In other cases the drive mechanism is supported in contact with a land traversing wheel. In still other cases the vehicle is provided with a fifth land traversing wheel adapted to provide accurate indications of speed and distance traversed. In all such cases the drive means includes essentially a gear mechanism of specific gear ratio in combination with the speedometer mechanism.

After considerable use, a gear type drive means does not maintain an accurate indication of speed and distance because of the wear of both the gear parts and the land traversing wheels. Even a small amount of wear will, over considerable distance, result in a considerable error especially in the recording of distance. For example, a "play" developed in a gear mechanism due to wear of interposing gear embodiments will cause an error such that a measured distance and the distance recorded by the meter will not coincide. For substantially high speed recording meters in which speed alone is important, a play in the gear mechanism is of no critical moment since even only approximate speeds are satisfactory. However, for meters of the low speed recording type, e. g. tractor speedometers, correct speed indication is most desirable since tractors usually move farm implements which operate satisfactorily only between certain substantially low speed limits. Moreover, low speed recording meters generally are adapted to indicate distances as well as low speeds and errors caused by wearing gear parts will cause discrepancies in the measurement of distances traversed.

It is an object of the present invention to provide a gearless drive for speedometers. It is another object of the present invention to provide a gearless drive for speedometers wherein such gearless drive operates in direct contact with a land traversing wheel of a vehicle. It is a further object of the present invention to provide a gearless drive for a low speed and distance recording meter. It is a still further object of the present invention to provide a gearless drive for speed and distance recording instruments of the type employed for tractors. Other objects and advantages of the present invention will become apparent from the description hereinafter following and the drawing forming part hereof in which:

Figure 1 is an elevational view of a drive means according to the present invention mounted in contact with a tractor land traversing wheel, Figure 2 is an elevational view of the drive means of the present invention with a cooperating flexible shaft shown disengaged therefrom, and Figure 3 is an exploded view of the drive means of the present invention.

The invention concerns in particular a gearless drive for a farm tractor speedometer cooperative with a flexible shaft operative to transmit a rotary motion of the drive means directly to the speedometer, said gearless drive being adaptable for contact preferably with the peripheral surface of a tractor land traversing wheel and, regardless of the wheel circumference, being capable of providing a gearless transmission of the rotary motion of the land traversing wheel directly to the speedometer in such manner that especially the indication of the distance traveled by the tractor coincides exactly with a measured distance.

Referring to Figure 1, the drive means 1 of the present invention is mounted in contact with the peripheral surface of a land traversing wheel 2 by means of a mounting comprising a yoke 3 having a supporting rod 4 and secured to the vehicle passing through both the apertured arms 5 and 6 near the end portions thereof. A pivot 7 is provided substantially at the apex of the yoke 3, said pivot or means supported thereon being rotatable in a plane perpendicular to the axis of the rod 4, the yoke 3 being rotatable about the axis of the shaft 4. A bridge arm 8 is supported by said pivot on one end thereof and the other end being secured to the drive means by the securing means 9. A flexible shaft 10 is connected between the drive means 1 and a speedometer mounted on the vehicle.

Figures 2 and 3 illustrate the drive means 1 and component parts thereof which comprise a cylindrical, preferably cylindrical and tubular, bearing 11 which rotates within the coaxial housing 12. In order to reduce friction and wearing of the bearing 11 within the housing 12, a pair of bearing rings, 13 and 14, are inserted into each end of the housing 12 so that rotational contact within said housing is between only the bearing 11 and rings 13 and 14. An end of the bearing 11 extends outwardly of the housing 11, said extending end having an annular groove 15 spaced from the extremity thereof and a slot 16 beginning at said extremity and continuing partly along the length of the bearing. The other end of said bearing is provided with a co-axial extension 17 of less diameter than said bearing and having a radially offset projection 18 thereon either abutting or spaced from the said other end of the bearing. The extension 17 may be at least partly threaded as at 19 for cooperating with the bolt 20 or it may be adapted to otherwise provide a retaining means for the drive wheel 21 which is centrally apertured at 22. The aperture 22 is provided with a radial slot 23 so that when the wheel 21 is positioned on the extension 17 the projection 18 engages the slot 23 to prevent independent rotatable movement of the wheel 21, i. e. any movement of the wheel 21 will rotate the bearing 11. In assembled form, as shown by Figure 2, the C-clamp 24, or the like retaining means, engages the annular groove 15 and preferably abuts an end of the bearing ring 14 to secure the bearing 11 and structures mounted thereon in operating position substantially free of longitudinal movement with respect to the housing 12.

The flexible shaft 19 is of the co-axial cable type containing an inner flexible shaft 25 rotatable within an outer non-rotatable flexible shaft generally designated at 19. The ends of the said inner shaft are provided with insert members 26 and 26' one of which has a projection 27 radially offset of its axis and engageable with the slot 16 when the cylindrical member 26 is inserted into the cooperating end of the bearing 11, which, as hereinbefore described, may be a tubular bearing, or which may otherwise be a solid cylindrical bearing having a cylindrical depression receptive to the end 26. Having engaged the projection 27 with the slot 26 the internally threaded cap 28 is secured to the housing 12 by means of the cooperating threaded portion 29 of the housing 12, the end 26 being thereby secured to and co-axial with the bearing 11 and wheel 21 so that rotatable movement of the bearing 11 is gearlessly transmitted directly to the flexible shaft and thereby to the speedometer.

However, it is essential that the driving wheel 21 be such that its diameter is related to the type of speedometer employed.

Various conventional types of meters are provided with meter driving shafts which rotate predetermined revolutions per minute for indicating a certain speed. To obtain the same indication of speed, the R. P. M. of shafts of different meters vary. In conjunction with such established R. P. M. of a meter shaft, a flexible cable is joined to the shaft and to a driver gear mechanism of specific gear ratio, the gear ratio being capable of transmitting rotatable motion to the meter at the R. P. M. corresponding to the R. P. M. necessary to drive the meter to indicate the established certain speed. The counted revolutions of such meters is the basis for indicating the distance traversed but this is not a true indication of exact distance traversed, since through substantially complicated gear mechanisms the indication is subject to considerable error especially from worn parts, etc.

The present invention eliminates the driver gear mechanism and substitutes therefor only a single driver wheel of predetermined diameter, said diameter depends not only on the meter speed indication but critically depends on the exact R. P. M. of a meter over a measured distance.

For example, if a meter shaft A of speedometer B rotates 1040 R. P. M. at a speed of 10 M. P. H., the shaft will rotate at 104 R. P. M. at 1 M. P. H. and the vehicle should travel 88 ft. or 1056 inches in one minute. For such distance at such speed the driver wheel of the invention would be exactly 10.1538 inches in circumference or 3.23 inches in diameter. If a meter shaft should rotate at 52 R. P. M. at 1 M. P. H. for the above measured distance or one half the R. P. M. of the above shaft to give the same meter indication, then the diameter of the driver wheel would be twice the diameter of the above wheel or 6.46 inches in diameter. In both cases it is apparent that the diameter of the drive wheel is dependent upon a measured distance and is inversely proportional to the R. P. M. of a meter shaft per unit time to exactly traverse such distance, and that such a drive wheel in combination with the structure hereinbefore described provides a direct gearless transmission to the indicating meter not only for indicating speed but also an exact indication of distance traversed, especially low speeds and small distances, for example; speeds and distances particularly related to farm tractors, etc. Since the diameter of the drive wheel is related to the meter shaft as above described, it is apparent that true speeds and exact distances can be indicated regardless of the size or diameter of a vehicle land traversing wheel 2 which the drive wheel 21 contacts.

What I claim is:

1. A drive means for recording speedometers comprising in combination a speedometer having a rotatable shaft, drive means for said speedometer, a flexible cable axially connected to said shaft and connecting said drive means with said shaft, said drive means comprising a cylindrical bearing and a co-axial housing therefor, an end of said cable being connected co-axial with and directly to an end of said bearing, said other end of said bearing having a radially offset projection, a drive wheel coaxial with and mounted on the other end of said bearing, said drive wheel having a diameter inversely proportional in size to the rated R. P. M. of said shaft at a designated speed indication over a measured distance, said drive wheel having a central aperture and a radial slot extending outwardly of said aperture, said offset projection being engageable with said slot in mounted position.

2. A drive means for recording speedometers comprising in combination a speedometer having a rotatable shaft, drive means for said speedometer, a flexible cable axially connected to said drive means comprising a cylindrical bearing and a co-axial housing therefor, an end of said cable being connected co-axial with and directly to an end of said bearing, a drive wheel co-axial with and mounted on the other end of said bearing, said drive wheel having a diameter inversely proportional in size to the rated R. P. M. of said shaft at a designated speed indication over a measured distance, said shaft having 1040 rated R. P. M. at 10 M. P. H. and the diameter of said drive wheel being 3.23 inches.

DELBERT CLARK MOLLENHOUR.

References Cited in the file of this patent

UNITED STATES PATENTS

| Number | Name | Date |
| --- | --- | --- |
| 321,365 | Hutches | June 30, 1885 |
| 441,334 | Scofield | Nov. 25, 1890 |
| 613,187 | Boyd | Oct. 25, 1898 |
| 1,227,517 | Yocum | May 22, 1917 |
| 1,634,565 | Wallbillich | July 5, 1927 |
| 1,752,019 | Mills et al. | Mar. 25, 1930 |
| 1,761,833 | Jones | June 3, 1930 |
| 2,041,134 | Kassler | May 19, 1936 |
| 2,184,488 | Conwell | Dec. 26, 1939 |